United States Patent [19]

Tyson

[11] Patent Number: 4,722,665

[45] Date of Patent: Feb. 2, 1988

[54] TURBINE

[76] Inventor: Warren N. Tyson, Ronleigh, Albury Road, Wagga Wagga, New South Wales, Australia

[21] Appl. No.: 794,578

[22] Filed: Nov. 4, 1985

[30] Foreign Application Priority Data

Nov. 7, 1984 [AU] Australia ................................ PG8020
May 9, 1985 [AU] Australia ................................ PH0495

[51] Int. Cl.$^4$ ........................... F03B 7/00; F03D 1/06
[52] U.S. Cl. ........................................ 416/84; 416/85; 416/11; 416/176; 416/188; 415/7
[58] Field of Search ...................... 416/176 A, 188, 11, 416/84–86, 197 A; 415/7

[56] References Cited

U.S. PATENT DOCUMENTS

| | | | |
|---|---|---|---|
| 188,020 | 3/1877 | Manley | 416/188 |
| 209,853 | 11/1878 | Benson | 416/188 X |
| 400,065 | 3/1889 | Dumont | 416/176 A X |
| 464,607 | 12/1891 | Brown | 416/176 A X |
| 508,683 | 11/1893 | Collins | 416/176 A X |
| 532,595 | 1/1895 | Seivert | 416/176 A X |
| 548,078 | 10/1895 | Miller | 417/336 |
| 587,814 | 8/1897 | Harford | 415/7 |
| 669,852 | 3/1901 | Peterson | 415/7 X |
| 868,798 | 10/1907 | McLaughlin | 416/85 |
| 932,628 | 8/1909 | Meyer | 417/336 |
| 1,147,658 | 7/1915 | Stukes | 416/85 |
| 1,191,950 | 7/1916 | Custer | 416/176 A X |
| 1,432,327 | 10/1922 | Gawley | 416/85 |
| 2,501,696 | 3/1950 | Souczek | 415/7 X |
| 2,730,631 | 1/1956 | Dandini | 416/84 X |
| 3,209,156 | 9/1965 | Struble | 415/7 |
| 3,708,060 | 1/1973 | Ben-Natan | 416/176 X |
| 4,524,285 | 6/1985 | Rauch | 416/85 X |

FOREIGN PATENT DOCUMENTS

| | | | |
|---|---|---|---|
| 101192 | 10/1925 | Austria | 415/7 |
| 105536 | 2/1927 | Austria | 416/85 |
| 2902518 | 7/1979 | Fed. Rep. of Germany | 416/86 |
| 547884 | 12/1922 | France | 416/188 |
| 557189 | 8/1923 | France | 416/176 A |
| 827487 | 4/1938 | France | 416/176 A |
| 977987 | 4/1951 | France | 416/176 A |
| 1237548 | 6/1960 | France | 415/3 A |
| 2505938 | 11/1982 | France | 416/11 |
| 1346 | 1/1977 | Japan | 415/7 |

Primary Examiner—Everette A. Powell, Jr.
Attorney, Agent, or Firm—Robert J. Schaap

[57] ABSTRACT

A water turbine has a series of spaced blades attached to and extending around the periphery of a body portion, preferably of conical or similar shape; each of the blades has a leading end mounted at a mid region of the body e.g. halfway along it and each blade generally increases in radial dimension in the downstream direction towards the base of the body and each blade generally decreases in pitch of the blade surface in the downstream direction. A channel is defined between adjacent blades, the channel diverging in the downstream direction and the base of the body extends transversely to the axis of the body and co-operates with the blade structure to provide a zone of relative low pressure near the axial region of the body whereby an efficient water turbine is provided.

37 Claims, 8 Drawing Figures

TURBINE

The present invention relates to a liquid operated turbine and more particularly, but not exclusively, to a water-operated turbine capable of pumping water, generating electricity or doing other work when fully or partially immersed in a stream of water.

For many applications it is desirable to harness the energy available in a flowing fluid. For example, in many agricultural applications there is a need for the energy in a stream to be used to pump water to a higher elevation for storage and/or stock use. In remote locations particularly there is also the demand for generation of electricity.

In the past waterwheels have been used to harness the energy of the water flowing in a stream or river. Generally, such waterwheels have had the disadvantage of very limited and inefficient performances especially in slow moving streams. To produce a useful waterwheel speed and power level a fast flowing stream is required or the construction of a dam is needed to provide sufficient head to drive the waterwheel.

Windmills are known for pumping water but the availability of wind is unpredictable and may not be sufficient when required. Windmills also work on the waterwheel principle and generally are not effective in light breezes.

There is a need for a very efficient water turbine capable of operation in water streams such as rivers and tidal streams, and suitable for economic manufactured so as to be durable. Furthermore, a turbine is required for developing relatively high power even at low stream velocities. Furthermore, for many applications it is important that the water turbine be able to operate despite the presence of foreign matter such as weed moving with the water stream.

The present invention is directed to new and useful developments and alternatives to the prior art.

According to the present invention there is provided a water turbine comprising a central body portion extending along an axis and increasing in radial dimension along the axial direction towards a base portion:

a plurality of blades spaced around the periphery of the central body portion and connected thereto thereby providing channels between respective blades, each blade extending from a leading end thereof located at an intermediate region on the periphery of the central body, a trailing end portion of each blade being located adjacent a peripheral region of said base portion, and each blade generally increasing in radial dimension and decreasing in pitch from the leading end thereof to the trailing end portion;

each channel between adjacent blades diverging in the downstream direction; and said base portion is such that when water flows axially over the body portion towards the base portion, the turbine rotates and a relatively low pressure zone in the water occurs adjacent to and downstream of the base portion in its region near the axis.

Preferably, the central body portion is conical.

Preferably, a small number of relatively large surface area blades are used, e.g., 5-12 and most preferably nine blades equidistantly spaced about the central body portion are provided. The trailing end of each blade is located adjacent the base portion and is approximately in the same axial plane as the leading end of the next but one adjacent blade; i.e. each blade overlaps in the circumferential direction by about 50% the next blade.

Each blade forms an angle of about 45° with an axial plane passing through the mid point of the blade.

Preferably, the leading end of each blade is located halfway along the central body portion.

With advantage, the central body portion can be hollow and can accomodate a pump, such as a positive displacement pump having a plurality of opposed cylinders and corresponding pistons connected to a crankshaft with means for varying the stroke of the pistons within the cylinders; for example a variable position crank pin can be provided. Alternatively a variable storke diaphragm pump can be used. Alternatively, an electricity generator may be housed in the body portion.

Embodiments of the invention will now be described, by way of example only, with reference to the accompanying drawings in which.

Figure 1:
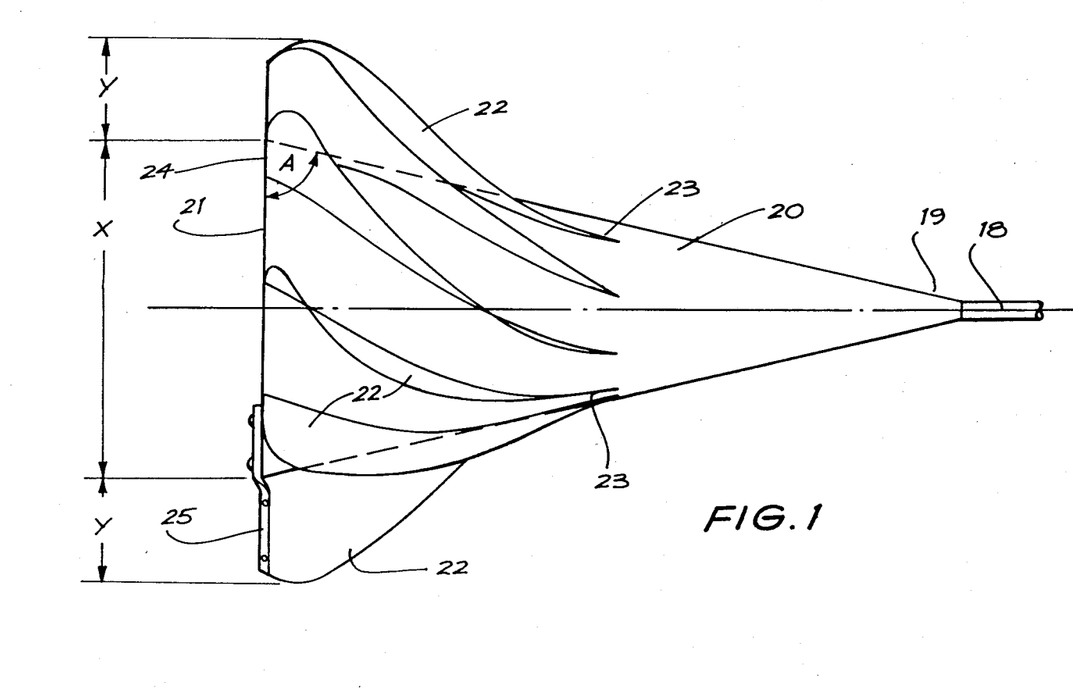
FIG. 1 is a side elevation of a water turbine embodying the present invention.

As illustrated in FIG. 1, the turbine has a conical central body 20 having an axis 18 and extending from a nose portion 19 to a transverse flat base portion 21 which is perpendicular to the axis 18. A set of nine spaced curved blades 22 are attached to the body 20.

The conical body has a base angle A of approximately 65° which in combination with the other structural features produces a highly efficient turbine for many purposes. Each blade 22 increases progressively in radial dimension as it extends from its leading end 23 to its trailing end 24, the leading end 23 being located approximately halfway along the central body 20 and the trailing end 24 being located in the plane of the base portion 21. FIG. 1 shows an optinal reinforcing bar 25 shown fixed to the trailing end 24 of the lowermost blade only and extending across a portion of the base to which it is fastened.

Figure 2:
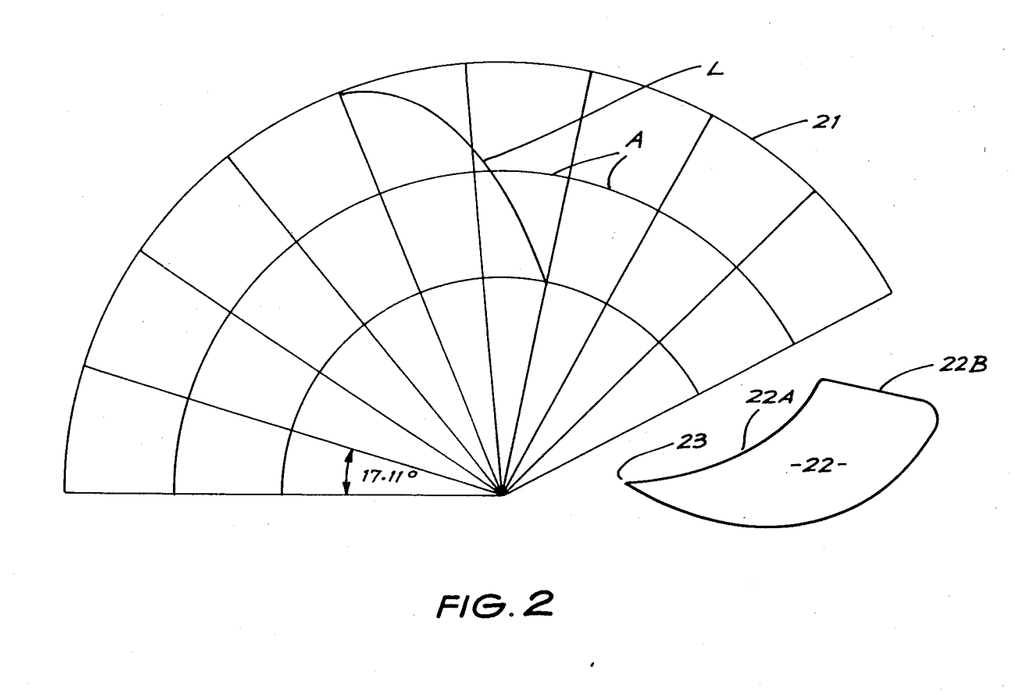
FIG. 2 is a constructional diagram for the turbine body and blades.

Each blade and the conical body 20 is economically fabricated from sheet metal, and as shown in FIG. 2 simple geometric forms are utilized. For greater efficency. each blade could be of airfoil shape but such shaping may incure greater capital costs. As best shown in FIG. 2, for the preferred embodiment which has nine blades, the conical body is fabricated from a segment of a circle of about 154° and to assist fabrication this is divided into nine sectors of 17.11° each. Each blade extends along the conical body and circumfercially around the body to the extent of occypying two sectors; thus there is a 50% overlap of one blade relative to the next blade. FIG. 2 shows the shape of each blade 22 when in flat form, the blade having an edge 22A arranged to abutt and be fixed to the conical body along a curved path such as line L. In the illustrated embodiment, the pitch of the blade decreases towards the base portion 21. From its leading end 23 the blade initially extends at an angle of about 34° to a line along the conical body in the axial plane and through the leading end and at a distance halfway between the leading end, and the base portion 21, represented by arc A, the pitch has decreases to about 45° and thereaffter the pitch decreases progressively further. The rear edge 22B of each blade has a substantial height relative to the diameter of the base portion of the conical body 20.

In a typical embodiment, the base portion 21 has a diameter, indicated by capital X in FIG. 1, of 60 cm and the height of the rear edge 22B of the blade indicated by dimention Y is about 20 cm. In this embodiment the overall diameter of the water turbine is about 1 meter and preferably the length of the turbine is also about 1 meter or the same as its overall diameter. In this embodiment the base angle A is about 65°.

A tubular mount 26 extends forwardly from the nose 19 of the conical body and is adapted to accommodate, for example, connections to a generator or water pump which may be mounted within the conical body.

The exact number of blades on the turbine, their shape and configuration and the proportions relative to the conical body may be varied, but the arrangement described with reference to FIGS. 1 and 2 is considered to provide a highly efficient turbine particularly suitable for use in relatively low velocity streams. For example, it has been found that with a turbine of overall diameter 1 meter a substantially linear relationship exists between peak load speed and rate of flow of the water stream. For example, with a the stream of one meter per second a turbine spead of about 24 rpm has been achieved.

Furthermore, it has been found that the turbine is relatively efficient in terms of power generation; the following examples are given by way of illustration only for a 1 meter turbine:

| Stream velocity | Power in watts |
| --- | --- |
| 0.5 m/s | 12.3 |
| 1 m/s | 98 |
| 2 m/s | 785 |
| 3 m/s | 2650 |

Furthermore, the shaping of the turbine including the divergence of the channel formed between the adjacent blades has been found to provide essentially a self-cleaning performance with respect to weed and debris carried by the water stream; nevertheless high efficiency is achieved. Embodiments of the invention can be versatile, cheap to manufacture, low in maintenance requirements, highly reliable and requiring a low degree of skill for installation, servicing and operation.

Another illustration of the performance by an embodiment of the invention is for a case of a turbine of overall diameter 1.5 m used in a very slow stream of 0.14 m/s (0.5 k.p.h.). It has been found that a pumping rate of 13.6 liters per minute is achievable using a water pump located within the turbine body, discharge being through a vertical rise of 18.2 meters.

Figure 3:
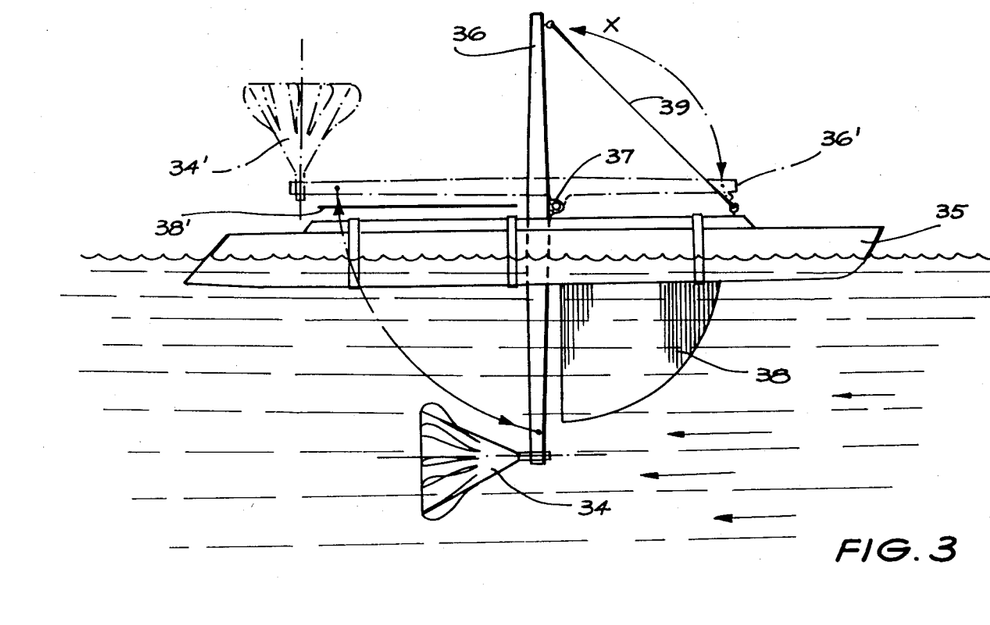
FIG. 3 is a side elevation showing schematically the turbine mounted on a catarmaran float.

Embodiments of the invention may be installed in many different ways but a particularly advantageous and useful installation will now be described with reference to FIGS. 3 and 4. The schematic drawing of FIG. 3 shows an embodiment of water turbine 34 attached to a catamaran float 35. In this embodiment the turbine has a larger number of blades than shown in FIGS. 1 and 2 but this is for illustrative purposes only.

The catamaran float has a support bar 36 mounted through a pivot pin 37 and the bar carries one end of the turbine 34.

A debris deflecting skeg 38 is also mounted between the floats of the catamaran float and is connected to the support 36. The support 36 is connected to a cable which when pulled in the direction of arrow X causes the assembly to pivot thereby raising the turbine 34 and skeg to the position shown in dotted lines for servicing and or transportation. The skeg may be dismounted and secured horizontally, as shown at 38 for transportation..

Alternative construction, which may be cheaper and more convenient, is one in which the turbine 34 is mounted on a rotatable shaft disposed at a shallow angle, and which is mounted in bearings above water level and drives a rotating load, such as a pump, generator or compressor.

Figure 4:
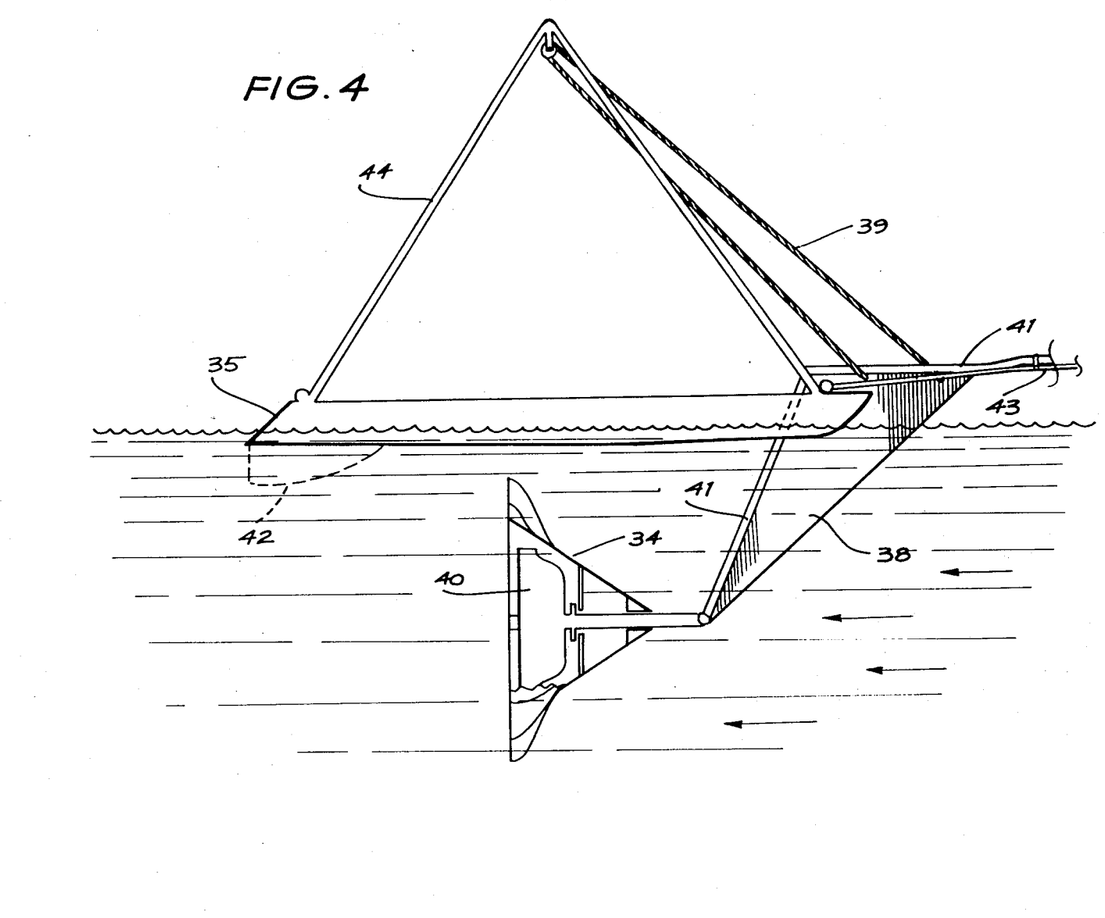
FIG. 4 is a side elevation of a practical form of float on which the turbine is mounted.

Refering now to the practical form of installation shown in FIG. 4, the same reference numerals as used in FIG. 3 have been used for corresponding parts. In this embodiment the turbine 34 is shown partially cut away and accomodating a water pump 40 connected to a delivery pipe 41, which is supported on a mooring cable 43. The float incorporates a gantry 44 on which the cable 39 is supported.

The hulls of the catamaran are slightly splayed with the upstream ends being further apart than the downstream end to produce a self-centering effect on the catamaran. Each hull may have a centerboard 42 (as shown in dotted lines) to further increase this centering effect and to increase the velocity of the water flow over the turbine by acting as a converging tunnel.

Figure 5:
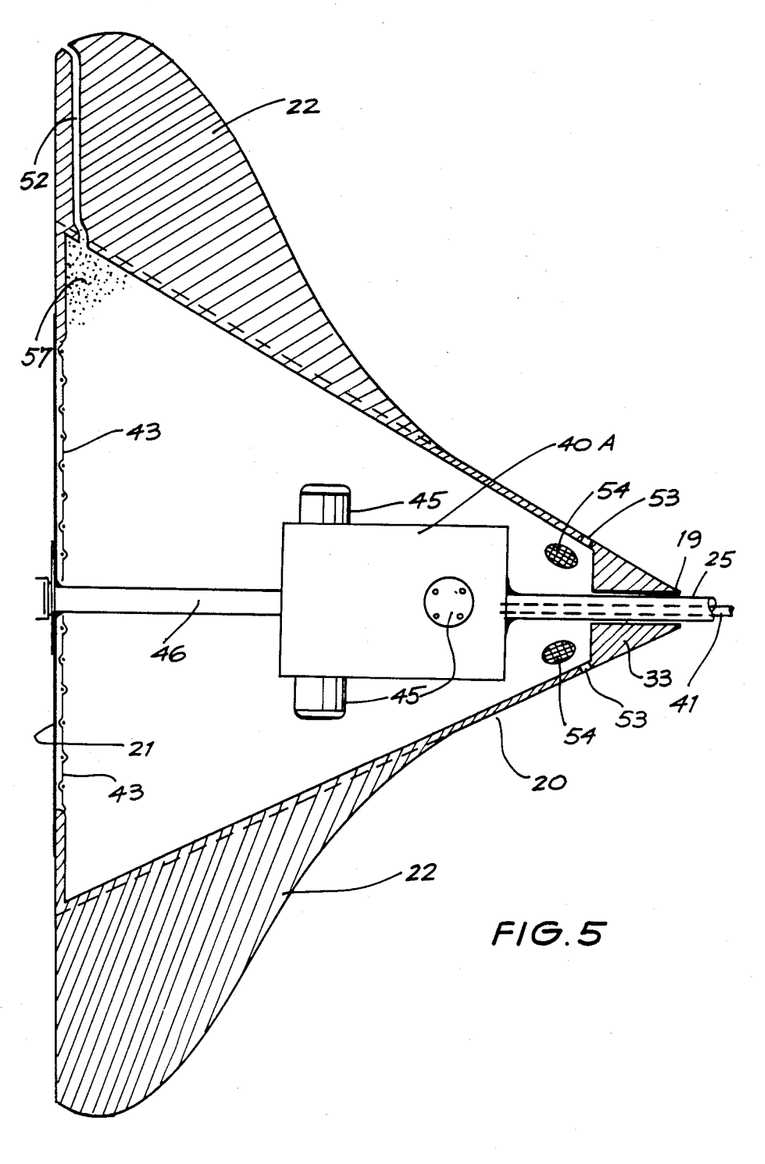
FIG. 5 is a cross-sectional view of the turbine of FIG. 4 showing the installation of a pump.

The embodiment of FIG. 5 incorporates a different form of water pump 40A, the pump having two sets of opposed pistons arranged to reciprocate within respective cylinders 45, the pistons being connected via respective connecting rods to a crankshaft 46 connected to the base portion 21 of the turbine for rotation therewith. The front end of the pump is mounted to the mounting tube 25.

An aperture is provided in the base of the turbine body and covered with mesh 43. The water may have sand or other particles entrained with it and these particles tend to build up inside the rear of the conical body as indicated at 57. To avoid this problem a small pipe 52 extends along at least some of the blades radially outwardly to the outer tip thereof for discharging this sand. Small holes 53 are provided near the nose, just downstream of solid infill 33, for draining the body of the turbine when it is lifted from the water (as described with reference to FIG. 3).

A preferred alternative water inlet arrangement is shown in dotted lines in FIG. 5, namely a series of inlet holes 54 near the nose 19 and covered with mesh. Sand is effectively discharged through the pipes 52 at the rear end.

Figure 6:
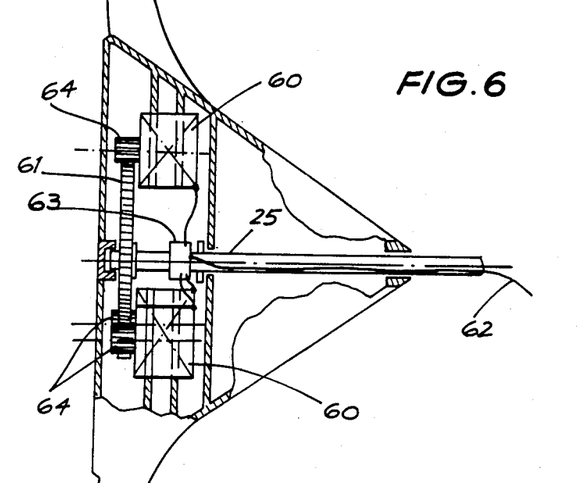
FIG. 6 is a sectional elevation of the turbine incorporating three internal electricity generators.
Figure 7:
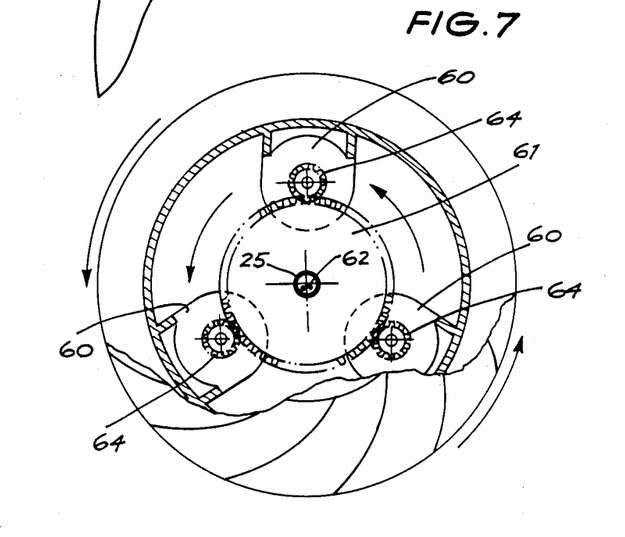
FIG. 7 is a sectional end elevation of the turbine of FIG. 6.

FIGS. 6 and 7 show the turbine being used with internal electricity alternators fixed to the inside of the body portion for rotation therewith. A sun wheel 61 is fixed to the mounting tube 25 and arranged to interact with planet gears 64 driving the alternators 60 to produce electricity. The alternators are connected to power cables 62 via slip rings 63 to deliver the electrical power along power cables which run through the centre of the mounting bar 25.

Figure 8:
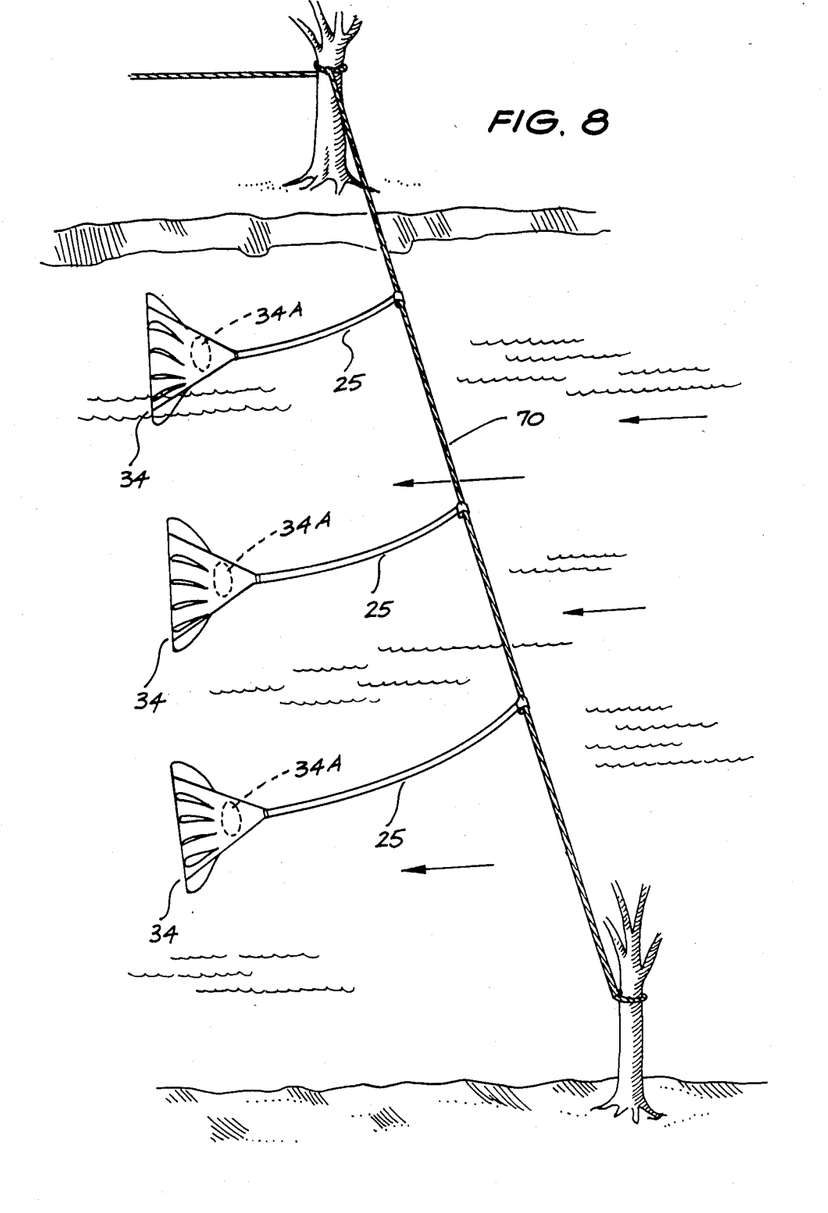
FIG. 8 is an illustration of an embodiment using neutral buoyancy installed across a river.

The turbine may be fitted with a device for providing neutral buoyancy: this may be in the form of an inflatable bladder fitted within the turbine. The bladder is inflated sufficiently so the turbine remains suspended within the stream just below the surface. The turbine is rotatably attached to and tethered by a fixed mounting bar 25 to prevent it from floating away: a float is not required. In FIG. 8, a mounting cable 70 extends across a river between two fixtures, such as trees, and each of a series of turbines 34 are tethered to the cable and drive rotating lines, such as pumps installed within the turbine body.

The shape of the central body portion and the blades allow typical speeds of rotation which are greatly in excess of that expected from a conventional waterwheel which is limited to stream speed. This is thought to result from a venturi effect on the blades; the water velocity is increased as it passes along the central body portion and impinges upon the blades to rotate the turbine. The water continues to accelerate through the channels created between the blades as it is sucked into the low pressure zone immediately behind the turbine created by the abrupt ending of the central body portion, i.e. the large flat base portion. This acceleration causes a relatively low pressure region to be formed at the back of the blades, which is believed to assist in producing a high efficiency design.

I claim:

1. A water turbine comprising:
   a central body portion extending along an axis and increasing in radial dimension along the axial direction toward a base portion;
   means for mounting the turbine substantially immersed in a flowing water stream and with said axis substantially aligned with the stream;
   approximately 5-12 blades spaced around the periphery of the central body portion and connected thereto thereby providing channels between respective blades, each blade extending from a leading end thereof located at an intermediate region on the periphery of the central body, each said leading end being located at a shallow angle to the flow of water to avoid imparting severs directional change to the water at each leading end and also smoothly leading from the central body portion whereby solid matter entrained with said water stream is deflected, a trailing end portion of each blade being located adjacent a peripheral region of said base portion, and each blade generally increasing in radial dimension and decreasing in pitch from the leading end thereof to the trailing end portion;
   each channel between adjacent blades diverging in the downstream direction; and
   said base portion having a transverse wall structure which provides a relatively low pressure zone in the water adjacent to and downstream of the base portion in its region near the axis when the turbine is in use and to thereby provide a predominately axial flow turbine.

2. A water turbine as claimed in claim 1 and wherein said transverse wall of the base portion extends substantially perpendicular to the axis.

3. A turbine, as claimed in claim 1 wherein the central body portion is conical.

4. A turbine as claimed in claim 1, wherein the trailing end of each blade is located adjacent the base portion and is substantially in the same axial plane as the leading end of the next but one adjacent blade.

5. A turbine as claimed in claim 1 and wherein each blade extends from its leading end at an acute angle to an axial plane passing through the leading end and extends at an angle of approximately 45° to an axial plane passing through the mid point of the blade.

6. A turbine as claimed in claim 1 and wherein there are approximately nine of said blades.

7. A turbine as claimed in claim 1 and wherein at the trailing end portion the radial dimension of each blade is in the range 10% to 40% of the overall diameter of the turbine.

8. A water turbine as claimed in claim 1 and wherein the radial dimension of each blade is approximately 20% of the overall diameter of the water turbine, the radial dimension of each blade progressively increasing from the leading end to the trailing end portion.

9. A turbine as claimed in claim 1 and wherein the leading end of each blade is located substantially half way along the central body portion.

10. A turbine as claimed in claim 1 and wherein the intersection between the root of each blade and the central body portion extends along a curved line from which the blade extends substantially radially outwardly.

11. A turbine as claimed in claim 1 and wherein the central body portion is conical and has an angle of about 65° between the conical wall and the base portion, which extends substantially at right angles to the axis of the cone.

12. A turbine as claimed in claim 1, and wherein a pump is mounted within the central body portion and is connected so as to be driven by rotation of the central body portion, a water inlet being provided therein.

13. A turbine as claimed in claim 12, wherein the pump is a positive displacement pump having a plurality of opposed cylinders and corresponding pistons connected to a crankshaft and means for varying the stroke of the pistons within the cylinders.

14. A turbine as claimed in claim 12 and wherein the pump is a diaphragm pump having a drive system connected to the turbine body portion and including means for altering the stroke of the diaphragm pump.

15. A turbine as defined in claim 12, wherein at least one conduit extends radially outwardly from the interior of the central body portion adjacent the base portion to a discharge point at or adjacent the trailing edge of an adjacent blade for discharging particulate material from the water stream away from the pump.

16. A turbine as claimed in claim 1 and in combination with a float, the turbine being mounted on the float for location in first and second positions; in the first position the turbine is located above the float for transportation, and in the second position the turbine is located beneath the float for operation by immersion in a water stream.

17. A turbine as defined in claim 1 and having neutral buoyancy.

18. A water turbine aparatus comprising mounting means for mounting one or more water turbines in a stream, each turbine being as claimed in claim 17 and connected to drive a rotating load.

19. A water turbine comprising a generally conical central body portion having a leading nose with associated means for mounting the water turbine substantially immersed in a flowing stream, means upstream of said nose for aligning the turbine with the flowing stream and deflecting any entrained solid matter, a base portion for the body portion extending generally transverse to the axis of the cone enabling the formation of a relatively low pressure water zone adjacent to the base portion downstream of the base portion, and an array of approximately 9 blades spaced around the periphery of the central body portion and connected thereto thereby providing channels between respective blades, each blade having a leading end located at a shallow angle to the flow of water to avoid imparting severe directional change to the water and each blade also extending smoothly from the profile of the central body portion at an intermediate region on the periphery of the central body portion to a trailing end portion of each blade located adjacent to a peripheral region of said base portion, and each blade generally increasing in radial dimension and decreasing in pitch from the leading end thereof to the trailing end portion, each channel between adjacent blades diverging in the direction along the body portion and towards the base portion, each blade extending from its leading end at an acute angle to an axial plane passing through the leading end and extending at a greater angle of approximately 45° to an axial plane passing through the mid-point of the blade and to thereby provide a predominately axial flow turbine.

20. The water turbine as claimed in claim 19 and wherein the radial dimension of each blade at the trailing end is approximately 20% of the overall diameter of the water turbine, the radial dimension of each blade progressively increasing from the leading end to the trailing end portion.

21. A power generator comprising:
(a) a buoyant support adapted to float in a flowing water stream and to be anchored,
(b) a turbine apparatus adapted to be secured to the buoyant support and to rotate when substantially immersed in the water stream, said rotation being about a substantially horizontal axis,
(c) means connected to the turbine apparatus for transmitting power generated by the turbine,
(d) rigid deflector means mounted on the buoyant support upstream of the turbine apparatus for deflecting away from the turbine apparatus solid material entrained in the water flow, the turbine apparatus comprising a generally conical body portion increasing in radial dimension in the downstream direction to a base portion and having blades mounted on the periphery thereof and connected to the buoyant support through the leading end thereof,
(e) the apparatus being configured and dimensioned for permitting the water stream to flow freely over and around the turbine apparatus,
(f) the turbine apparatus having approximately 5-12 blades spaced around the periphery of the conical body portion and connected thereto thereby providing channels between respective blades,
(g) each blade extending smoothly from the profile of the conical body portion from a leading end of the blade located at an intermediate region on the periphery of the conical body portion to a trailing end portion of the blade located adjacent a peripheral region of said base portion,
(h) each blade generally increasing in radial dimension and decreasing in pitch from the leading end thereof to the trailing end portion,
(i) each blade also having a leading end located at a shallow angle to the flow of the water stream to avoid imparting a severe directional change to water entering at the leading end,
(j) each channel between adjacent blades diverging in the direction along the body portion and towards the base portion and,
(k) the base portion extending transversely to the axis of the conical body portion for establishing a low pressure zone in the water stream immediately downstream of the base portion to thereby provide a predominately axial flow turbine.

22. A power generator as claimed in claim 21 and wherein the radial dimension of each blade at the trailing end is approximately 20% of the overall diameter of the water turbine, and each blade extending from its leading end at an acute angle to an axial plane passing through its leading end and extending at a greater angle of approximately 45° to an axial plane passing through the junction of the mid-point of the blade with the conical body portion.

23. A power generator as claimed in claim 22 and wherein the angle of the conical wall of the body portion to the axis thereof is approximately 25° and the trailing end of each blade is located adjacent the base portion and is substantially in the same axial plane as the leading end of the next but one adjacent blade.

24. A water tubine as claimed in claim 1 and mounting means includes a fixed vertical plate-like element for mounting upstream of the central body portion and substantially on said axis, and shaped and dimensioned to deflect entrained solid matter in said water stream and to align the central body portion with said water stream, and there being provided clear space around the central body portion for water flow together with any deflected solid matter.

25. A water turbine comprising:
(a) a conically shaped central body portion extending along an axis and having an annular surface which increases in radial dimension from an inlet portion along an axial direction towards a base portion,
(b) a plurality of blades spaced around the periphery of the central body portion and connected thereto, thereby providing channels between the respective blades, each blade having a leading end located at a shallow angle to the flow of water to avoid imparting severe directional change to the water, and each blade extending from the leading end thereof located at an intermediate region on the periphery on the central body portion, a trailing end portion of each blade being located adjacent a peripheral region of said base portion, and each blade generally increasing in radial dimension and decreasing in pitch from the leading and thereof the trailing end portion,
(c) each channel between adjacent blades diverging in the downstream direction,
(d) said base portion having a transverse wall structure which provides a relatively low pressure zone in the water adjacent to and downstream of the base portion in its region near the axis when the turbine is in use, and
(e) the angle between (1) a line on the annular surface coplanar with the axial direction and (2) the transverse wall structure being approximately 65 degrees to thereby enable substantial axial flow along the body portion and to thereby provide a predominately axial flow turbine.

26. The turbine of claim 25 further characterized in that said transverse wall of the base portion extends substantially perpendicular to the axis.

27. The turbine of claim 25 further characterized in that the trailing end of each blade is located adjacent to the base portion and is substantially in the same axial plane as the leading end of the next but one adjacent blade.

28. The turbine of claim 25 further characterized in that the leading end of each blade is located substantially half way along the central body portion.

29. A water turbine comprising:
(a) a conically shaped central body portion extending along an axis and having an annular surface which increases in radial dimension from an inlet portion along an axial direction towards a base portion,
(b) a plurality of blades spaced around the periphery of the central body portion and connected thereto, thereby providing channels between the respective blades, each blade having a leading end located at a shallow angle to the flow of water to avoid imparting severe directional change to the water, and each blade extending from a leading end thereof located at an intermediate region on the periphery on the central body portion, a trailing end portion of each blade being located adjacent a peripheral region of said base portion, and each blade generally increasing in radial dimension and decreasing in pitch from the leading end thereof to the trailing end portion,
(c) each channel between adjacent blades diverging in the downstream direction,
(d) said base portion having a transverse wall structure which provides a relatively low pressure zone in the water adjacent to and downstream of the base portion in its region near the axis when the turbine is in use, and
(e) the elongate blades extending along and partially around the conical body portion and being attached to the body portion along a line of attachment, the angle of the blade at a midpoint of the line of attachment to an axial plane passing through the midpoint of the blade being about 45° and the angle of the blade at an axial plane passing through its leading edge being no greater than about 45° and to thereby provide a predominately axial flow turbine.

30. The water turbine of claim 29 wherein the conical body portion and each blade is fabricated from sheet steel and each blade comprises simple curve fixed along its root to the conical body.

31. The water turbine of claim 29 wherein the angle between (1) a line on the annular surface co-planar with the axial direction and (2) the transverse wall structure being approximately 65 degrees to thereby enable substantial axial flow along the body portion.

32. The turbine of claim 29 further characterized in that said transverse wall structure of the base portion extends substantially perpendicular to the axis.

33. The turbine of claim 29 further characterized in that the trailing end of each blade is located adjacent to the base portion and is substantially in the same axial plane as the leading end of the next but one adjacent blade.

34. The turbine of claim 29 further characterized in that the leading end of each blade is located substantially half way along the central body portion.

35. A water turbine comprising:
(a) a conically shaped central body portion extending along an axis and having an inlet leading nose portion and annular surface which increases in radial dimension from the inlet portion along an axial direction towards a base portion,
(b) means for mounting the water turbine substantially immersed in a flowing stream of water,
(c) an array of approximately five to twelve blades spaced around the periphery of the central body portion and connected thereto, thereby providing channels between the respective blades, each blade having a leading end located at a shallow angle to the flow of water to avoid imparting severe directional change to the water, and each blade extending from the leading and thereof located at an intermediate region on the periphery on the central body portion, each blade further extending from its leading end at an acute angle to an axial plane passing through the leading end and extending at a greater angle of approximately 45° to an axial plane passing through the midpoint of the blade, a trailing end portion of each blade being located adjacent a peripheral region of said base portion, and each blade generally increasing in radial dimension and decreasing in pitch from the leading end thereof to the trailing end portion,
(d) each channel between adjacent blades diverging in the downstream direction,
(e) said base portion having a transverse wall structure which provides a relatively low pressure zone in the water adjacent to and downstream of the base portion in its region near the axis when the turbine is in use, and
(f) the angle between (1) a line on the annular surface coplanar with the axial direction and (2) the transverse wall structure being approximately 65° to thereby enable substantial axial flow along the body portion and to thereby produce a predominately axial flow turbine.

36. A water turbine comprising:
(a) a conically shaped central body portion extending along an axis and having an inlet leading nose portion and annular surface which increases in radial dimension from the inlet portion along an axial direction towards a base portion,
(b) plurality of blades spaced around the periphery of the central body portion and connected thereto, thereby providing channels between the respective blades, each blade having a leading end located at substantially halfway along the periphery of the central body portion, a trailing end portion of each blade being located adjacent a peripheral region of said base portion and which trailing end portion is in the same axial plane of the next but one adjacent blade, and each blade generally increasing in radial dimension and decreasing in pitch from the leading end thereof to the trailing end portion,
(c) each channel between adjacent blades diverging in the downstream direction,
(d) said base portion having a transverse wall structure extending substantially perpendicular to the axis and which provides a relatively low pressure zone in the water adjacent to and downstream of the base portion in its region near the axis when the turbine is in use, and
(e) the angle between (1) a line on the annular surface coplanar with the axial direction and (2) the transverse wall structure being approximately 65° to thereby enable substantial axial flow along the body portion and to thereby produce a predominately axial flow turbine.

37. A water turbine comprising:
(a) a conically shaped central body portion extending along an axis and having an annular surface which increases in radial dimension from an inlet portion along an axial direction towards a base portion,
(b) a plurality of blades spaced around the periphery of the central body portion and connected thereto, thereby providing channels between the respective blades, each blade extending from a leading and thereof located at an intermediate region on the periphery on the central body portion, a trailing end portion of each blade being located adjacent a peripheral region of said base portion, and each blade generally increasing in radial dimension and decreasing in pitch from the leading end thereof to the trailing end portion,
(c) each channel between adjacent blades diverging in the downstream direction,
(d) said base portion having a transverse wall structure which provides a relatively low pressure zone in the water adjacent to and downstream of the base portion in its region near the axis when the turbine is in use, and
(e) the elongate blades extending along and partially around the conical body portion and being attached to the body portion along a line of attachment, the angle of the blade at a midpoint of the line of attachment to an axial plane passing through the midpoint of the blade being about 45° and the angle of the blade at an axial plane passing though its leading edge being no greater than about 45°, the angle between (1) a line on the annual surface co-planar with the axial direction and (2) the transverse wall structure being approximately 65° to thereby enable substantial axial flow along the body portion and the trailing end of each blade being located adjacent to the base portion and in substantially the same axial plane as the leading end of the next but one adjacent blade.

* * * * *